United States Patent

Barthelemy et al.

[11] Patent Number: 5,948,174
[45] Date of Patent: Sep. 7, 1999

[54] HYDROFLUOROCARBON-CONTAINING COMPOSITIONS AND METHOD FOR REMOVING WATER FROM A SOLID SURFACE

[75] Inventors: Pierre Barthelemy, Pietrebais; Mireille Paulus, Brussels; Robert Putteman, Lebbeke, all of Belgium

[73] Assignee: SOLVAY (Société Anonyme), Brussels, Belgium

[21] Appl. No.: 08/913,759

[22] PCT Filed: Mar. 19, 1996

[86] PCT No.: PCT/EP96/01232

§ 371 Date: Dec. 29, 1997

§ 102(e) Date: Dec. 29, 1997

[87] PCT Pub. No.: WO96/30487

PCT Pub. Date: Oct. 3, 1996

[30] Foreign Application Priority Data

Mar. 31, 1995 [FR] France .................................. 95 03931

[51] Int. Cl.$^6$ .................................. C11D 1/58; C11D 3/24
[52] U.S. Cl. .............................. 134/42; 510/409; 510/412
[58] Field of Search ............................ 510/175, 256, 510/273, 409, 412; 134/42

[56] References Cited

U.S. PATENT DOCUMENTS

| 3,903,012 | 9/1975 | Brandreth | 252/194 |
|---|---|---|---|
| 4,763,423 | 8/1988 | Kemp, Jr. | 34/9 |
| 5,478,492 | 12/1995 | Barthelemy et al. | 252/171 |
| 5,578,138 | 11/1996 | Paulus et al. | 134/42 |

FOREIGN PATENT DOCUMENTS

| 2217045 | 9/1974 | France . |
|---|---|---|
| 9406237 | 5/1994 | France . |
| 3186305 | 8/1991 | Japan . |
| 51668805 | 7/1993 | Japan . |
| 5171190 | 7/1993 | Japan . |
| 1825367 | 6/1993 | U.S.S.R. . |

*Primary Examiner*—John R. Hardee
*Attorney, Agent, or Firm*—Venable; John W. Schneller

[57] ABSTRACT

Compositions comprising a $C_3$–$C_{10}$ hydrofluorocarbon, a cosolvent and a surface-active agent comprising at least one imidazoline, which can be used for removing water from a solid surface.

9 Claims, No Drawings

HYDROFLUOROCARBON-CONTAINING COMPOSITIONS AND METHOD FOR REMOVING WATER FROM A SOLID SURFACE

FIELD OF THE INVENTION

The present invention relates to compositions based on a hydrofluorocarbon and to a process for removing water from a solid surface by means of these compositions.

TECHNOLOGY REVIEW

In the electrical, electronic, optical and mechanical industries in particular, especially during the production of high precision components, it can happen that these, intentionally or otherwise, come into contact with water or moisture. There is a risk of the water adhering to the surface of these components and then causing certain harmful effects during subsequent stages of their use or detrimentally affecting their quality. It is consequently essential, for numerous precision components, to be completely free from water adhering to the surface. This operation for removing water from the surface can be carried out in particular by displacement of the water by means of a dense water-immiscible organic liquid optionally containing a surface-active agent.

Numerous hydrofluorocarbon-based compositions for the removal of water by displacement of the latter have already been provided, in particular compositions based on 1,1,1,3,3-pentafluorobutane. In particular, in Patent Application JP-A-05/168805, a description is given of compositions composed of 1,1,1,3,3-pentafluorobutane, of a solvent soluble in 1,1,1,3,3-pentafluorobutane and of a surface-active agent selected from salts derived from aliphatic fatty monocarboxylic acids and from aliphatic fatty monoamines.

When these known compositions are used to remove water from a solid surface, very small droplets of water are nevertheless often retained at the surface. Moreover, such compositions sometimes form emulsions with the water, which makes the subsequent separation of the composition from the displaced water difficult. These compositions are sometimes exhausted very quickly, so that, after a few cycles of use in removing water from the surface of components, they lose all their effectiveness.

Compositions which avoid this disadvantage comprise 1,1-dichloro-1-fluoroethane and an imidazoline (French Patent Application 94.06237). However, 1,1-dichloro-1-fluoroethane has a non-zero ozone destruction potential (ODP).

However, the substitution of 1,1,1,3,3-pentafluorobutane, such as for 1,1-dichloro-1-fluoroethane, is ruled out because imidazolines are generally insoluble in 1,1,1,3,3-pentafluorobutane.

SUMMARY OF THE INVENTION

A means has now been found for dissolving imidazolines in 1,1,1,3,3-pentafluorobutane and generally in hydrofluorocarbons which exhibit a zero ozone destruction potential, thus making it possible to obtain compositions exhibiting a good ability to remove water from solid surfaces without exhibiting the abovementioned disadvantages of the known compositions.

The invention consequently relates to compositions comprising a $C_3$–$C_{10}$ hydrofluorocarbon, a cosolvent and a surface-active agent, the latter comprising at least one imidazoline.

DETAILED DESCRIPTION OF THE INVENTION $C_3$–$C_{10}$ hydrofluorocarbon is understood to denote saturated aliphatic or alicyclic hydrocarbons comprising from 3 to 10 carbon atoms, at least one fluorine atom and at least one hydrogen atom. In particular, hydrofluorocarbons which can be used in the compositions according to the invention are hydrofluoroalkanes of general formula $C_aH_bF_c$, in which a is an integer from 3 to 8, b is an integer from 1 to (a+2) and c is an integer from a to (2a+1). Hydrofluoroalkanes as defined above containing from 4 to 6 carbon atoms are preferred. By way of example, the hydrofluoroalkane of the compositions according to the invention can be selected from compounds of empirical formula $C_4H_5F_5$, $C_4H_4F_6$ and $C_5H_2F_{10}$, such as 1,1,1,3,3-pentafluorobutane (HFC-365mfc), 1,1,1,2,2,4-hexafluorobutane (HFC-356mcf) and 1,1,1,2,2,3,4,5,5,5-decafluoropentane (HFC-4310mee). 1,1,1,3,3-Pentafluorobutane is very well suited. The compositions according to the invention can also contain mixtures of hydrofluorocarbons.

Cosolvent is understood to denote an organic compound, or a mixture of several organic compounds, which is miscible with the hydrofluorocarbon in proportions by weight from 1:100 to 1:1 and in which the imidazoline exhibits a solubility of at least approximately 0.002% by weight.

Cosolvents which can be used in the compositions according to the invention comprise $C_5$–$C_{10}$ alkanes, $C_5$–$C_{10}$ cycloalkanes, $C_1$–$C_{10}$ alcohols (for example methanol, ethanol, propanol, isopropanol and decanol), $C_3$–$C_8$ ketones (for example acetone, methyl ethyl ketone, methyl butyl ketone and diethyl ketone), $C_2$–$C_8$ esters (for example methyl formate, ethyl formate, methyl acetate and ethyl acetate), $C_2$–$C_8$ ethers (for example diethyl ether, methyl ethyl ether, tetrahydrofuran and 1,4-dioxane), $C_1$–$C_3$ chlorinated hydrocarbons (for example dichloromethane, trans-1,2-dichloroethylene and cis-1,2-dichloroethylene) and $C_2$–$C_4$ chlorofluorinated hydrocarbons (for example 1,1-dichloro-1-fluoroethane).

Imidazoline is understood to denote any organic compound comprising a structure

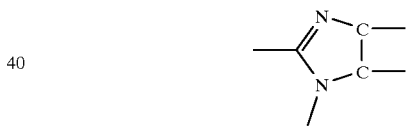

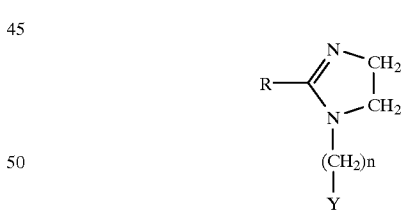

containing at least 2 carbon atoms, Y represents a hydroxyl or amino group and n is an integer equal to at least 1. In this preferred embodiment of the compositions according to the invention, the number of carbon atoms in the alkyl or alkenyl chain R generally does not exceed 25, preferably 20. Imidazolines in which R is an alkyl or alkenyl chain comprising at least 6, preferably at least 10, carbon atoms are particularly preferred. The imidazolines in which R comprises 11 or 17 carbon atoms are very particularly preferred. In this preferred embodiment of the compositions according to the invention, the integer n generally does not exceed 20, preferably 12. The imidazolines in which n is 2 are particularly preferred. The imidazolines in which R comprises 11 or 17 carbon atoms and n is 2 are particularly advantageous, particularly those in which R comprises 17 carbon atoms, n is 2 and Y is an amino group.

The imidazoline used in the compositions according to the invention can be in the form of the free base or in the form of a mono- or dicarboxylate salt. In the case where the imidazoline is in the form of a mono- or dicarboxylate salt, the carboxylate part is preferably derived from a saturated or unsaturated fatty acid containing from 4 to 22 carbon atoms. Good results have been obtained with oleates and laurates. According to an advantageous embodiment of the compositions according to the invention, the imidazoline is in the form of the free base or in the form of a monocarboxylate salt.

Imidazolines which can be used in this embodiment of the compositions according to the invention are well known and can in particular be synthesized by reaction, at high temperature, of saturated or unsaturated fatty acids corresponding to the formula RCOOH with substituted ethylenediamines of formula $NH_2—CH_2—CH_2—NH—(CH_2)_n—Y$. They are also found commercially, in particular under the names of Servamin®KOO 360 and Servamin®KOO 330 (sold by the firm Servo), of Imidazoline 18NH, Imidazoline 18OH, Imidazoline 12NH and Imidazoline 12OH (sold by the firm Lakeland) and of Miramine®HDO (sold by the firm Rhône-Poulenc).

In the compositions according to the invention, the hydrofluorocarbon content is advantageously at least 50%, preferably at least 60%, of the total weight of the composition. The hydrofluorocarbon content generally does not exceed 97.5%, preferably 95% and, in a particularly preferred way, 90% of the total weight of the composition.

In the compositions according to the invention, the cosolvent content is advantageously at least 2%, preferably at least 4% and, in a particularly preferred way, at least 10% of the total weight of the composition. The cosolvent content generally does not exceed 49%, is preferably 39% and, in a particularly preferred way, 35% of the total weight of the composition.

In the compositions according to the invention, the imidazoline content is advantageously at least 0.001%, preferably at least 0.01%, of the total weight of the composition. The imidazoline content generally does not exceed 5%, preferably 1%, of the total weight of the composition.

The compositions according to the invention can contain, in addition to the hydrofluorocarbon, cosolvent and surface-active agent, additives which make it possible to improve the performance of the compositions when they are used, such as stabilizers, de-emulsifiers and/or antifoaming agents.

In the compositions of the invention, the surface-active agent can contain, in addition to the imidazoline, one or more other surface-active agents.

Compositions containing an azeotrope between the hydrofluorocarbon and the cosolvent are preferred. As examples of such compositions, mention may be made of compositions containing 1,1,1,3,3-pentafluorobutane with methanol, ethanol, dichloromethane and/or trans-1,2-dichloroethylene.

Compositions composed essentially of 1,1,1,3,3-pentafluorobutane, trans-1,2-dichloroethylene and at least one imidazoline are particularly preferred.

The compositions according to the invention are liquid compositions which are particularly well suited to displacing water from solid surfaces. This is because they satisfy the strictest criteria applicable to compositions used to remove water from solid surfaces by displacement of this water. Thus, they are particularly effective in displacing more than 70%, generally at least 95%, or even all, of the water present on a solid surface. The displacement of the water is very rapid. In this application, the compositions according to the invention exhibit the advantage that they do not form an emulsion with the water but promote, on the contrary, the formation of two superimposed phases, one of which (the lower phase) is composed essentially of the composition according to the invention, in which a small amount of water may possibly be dissolved, and the other of which (the upper phase) is composed essentially of the displaced water. This makes possible a simple subsequent separation of the displaced water from the composition. The compositions according to the invention exhibit the additional advantage that they lend themselves to a large number of successive uses, without their constitution undergoing substantial modification. This is because the cosolvent and the surface-active agent are not significantly extracted from the compositions by the water which is displaced and subsequently separated from the latter.

The compositions according to the invention are suitable for drying a great variety of different materials. They are suitable in particular for drying components or materials made of metal, glass, ceramic, precious stones or plastic.

The invention consequently also relates to a process for removing water from a solid surface, which is characterized in that the surface is treated with a composition according to the invention.

In order to treat the solid surface with the composition according to the invention, it is possible, for example, to subject it to spraying, to sprinkling, to painting with the composition or to immersion in a bath of the composition. According to a preferred embodiment of the process according to the invention, the solid surface is treated by immersion in a bath of the composition. In this case, the bath is, in a particularly preferred way, at boiling point.

EXAMPLES

The following non-limiting examples are given by way of illustration.

Example 1

A composition according to the invention was prepared by mixing 70 parts by weight of 1,1,1,3,3-pentafluorobutane and 30 parts by weight of trans-1,2-dichloroethylene, in which proportions these compounds form an azeotrope, and by then adding 0.2 part by weight of imidazoline Servamin®KOO 330. It was observed that the imidazoline dissolves virtually completely in the azeotropic mixture of 1,1,1,3,3-pentafluorobutane and of trans-1,2-dichloroethylene.

Example 2 (comparison)

100 parts by weight of 1,1,1,3,3-pentafluorobutane and 0.2 part by weight of imidazoline Servamin®KOO 330 were mixed. No dissolution of the imidazoline in the 1,1,1,3,3-pentafluorobutane was observed.

Comparison of Examples 1 and 2 shows that the imidazoline is dissolved in the compositions according to the invention comprising trans-1,2-dichloroethylene as cosolvent, whereas it is insoluble in 1,1,1,3,3-pentafluorobutane alone.

What is claimed is:

1. A composition comprising 1,1,1,3,3-pentafluorobutane, a cosolvent, and a surface-active agent comprising at least one imidazoline.

2. The composition according to claim 1, in which the cosolvent is selected from $C_5$–$C_{10}$ alkanes, $C_5$–$C_{10}$ cycloalkanes, $C_1$–$C_{10}$ alcohols, $C_3$–$C_8$ ketones, $C_2$–$C_8$ esters, $C_2$–$C_8$ ethers, $C_1$–$C_3$ chlorinated hydrocarbons and $C_2$–$C_4$ chlorofluorinated hydrocarbons.

3. The composition according to claim 1, in which the imidazoline corresponds to the formula

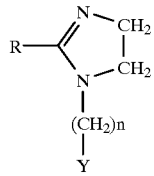

in which R represents an alkyl or alkenyl chain, Y represents a hydroxyl or amino group and n is an integer equal to at least 1.

4. The composition according to claim 1, containing with respect to the total weight of the composition, from 50 to 97.5% of hydrofluorocarbon, from 2 to 49% of cosolvent and from 0.001 to 5% of imidazoline.

5. The composition according to claim 1, containing, with respect to the total weight of the composition, from 60 to 95% of hydrofluorocarbon, from 4 to 39% of cosolvent and from 0.01 to 1% of imidazoline.

6. The composition according to claim 1, consisting essentially of 1,1,1,3,3-pentafluorobutane, trans-1,2-dichloroethylene and at least one imidazoline.

7. A process for removing water from a solid surface, comprising steps for:

contacting said surface with a composition according to claim 1, and removing water from said surface.

8. A composition comprising 1,1,1,3,3-pentafluorobutane, trans-1,2-dichloroethylene and at least one imidazoline.

9. The composition according to claim 8, containing 70 parts by weight of 1,1,1,3,3-pentafluorobutane, 30 parts by weight of trans-1,2-dichloroethylene and 0.2 part by weight of imidazoline.

* * * * *